United States Patent [19]

Gandini et al.

[11] 4,373,884
[45] Feb. 15, 1983

[54] EQUIPMENT FOR THE INJECTION MOLDING OF SPECTACLES BARS OF PLASTIC MATERIAL WITH METAL CORE

[76] Inventors: Giovanni Gandini, Via Fabio Filzi, 5, 21040 Venegono Inferiore (VA); Enrico Talamona, Via Plinio, 18, 21040 Venegono Superiore (VA), both of Italy

[21] Appl. No.: 320,293

[22] Filed: Nov. 10, 1981

[30] Foreign Application Priority Data

Nov. 11, 1980 [IT] Italy ................................ 25873 A/80

[51] Int. Cl.³ ........................... B29F 1/00; B29C 6/00
[52] U.S. Cl. ............................. 425/126 R; 425/129 R
[58] Field of Search ....... 425/126 R, 129 R, DIG. 44, 425/DIG. 58, 808

[56] References Cited

U.S. PATENT DOCUMENTS

| | | | |
|---|---|---|---|
| 1,152,249 | 8/1915 | Wells | 425/808 |
| 3,135,993 | 6/1964 | Ryan | 425/126 R X |
| 3,266,100 | 8/1956 | Belanger | 425/DIG. 58 |
| 3,387,334 | 6/1968 | Belanger et al. | 425/DIG. 58 |
| 3,531,869 | 10/1970 | Hays et al. | 425/DIG. 44 |
| 4,144,010 | 3/1979 | Fenner | 425/126 R X |
| 4,161,060 | 7/1979 | Lenne et al. | 425/129 R X |

*Primary Examiner*—L. Howard Flint, Jr.
*Attorney, Agent, or Firm*—Young & Thompson

[57] ABSTRACT

The present invention relates to equipment for the injection molding of spectacles bars of plastic material and for the introduction in said bars of metal stems or cores. In said equipment, the metal core—onto an end of which is previously welded the respective metal hinge—is axially inserted into the mold already filled with plastic material, wherein it is caused to slide along a grooved guide, into which it is held by means apt to be removed as the core moves forward.

6 Claims, 8 Drawing Figures

EQUIPMENT FOR THE INJECTION MOLDING OF SPECTACLES BARS OF PLASTIC MATERIAL WITH METAL CORE

BACKGROUND OF THE INVENTION

The present invention relates to an equipment for the injection molding of bars for spectacles, made of plastic material and incorporating a metal stem or core onto which the respective metal hinge is previously welded, or obtained in one piece therewith.

As everyone knows, it is very difficult to produce—in a single injection molding stage—finished bars for spectacles, already incorporating a stiffening metal stem or core.

In actual fact, if one prepares a mold in which the metal stem is arranged in a central position and held by its end provided with hinge, at the moment of injecting the plastic material—which should surround and envelop the core—the speed and pressure at which said material enters the mold, cause the curling up of the stem.

All the attempts made to hold the stem more firmly into the mold, during the injection of the plastic material, have always given negative results.

Different techniques—more or less complicated and anyhow comprising several working stages—have therefore been adopted for producing spectacle bars of the aforementioned type.

According to a first technique, one produces first of all a bar preform by injection molding. In a subsequent working stage, the preform is heated and a metal core, provided at one end with the respective hinge, is introduced with its other end into the preform, wherein it is caused to slide along the longitudinal axis thereof. The preform is heated to the softening point, so as to allow the introduction therein of the pointed and relatively narrow metal core. Obviously, at the end of said operation of introduction, the preform undergoes further treatment so as to acquire the final shape of the spectacle bar.

As can easily be realized, this technique involves:
two working stages,
the need to work on one bar at a time,
a high percentage of defective pieces,
a limitation in the shapes and sizes of the finished bars.

According to a more recent technique, it has been proposed to introduce the metal cores in the actual molding machine, immediately after the injection stage. To obtain this result, one uses a mold which is closed, at the end of the bar which will carry the hinge, by a knife element, a guide for the metal core being provided beyond said knife element and along the extension of the longitudinal axis of the bar. At the end of the injection stage and as soon as the mold has been filled with molten plastic material, after having interrupted the feed pressure, the closing knife is opened and the metal core is caused to slide axially into its guide by being thrust at one end and being introduced with the other end into the mold.

To make sure that the metal core—which, as already said, is very thin and flexible—does not bend during this operation of introduction (which tends to be opposed by the plastic material present in the mold, though at the semimolten state), it is indispensable for the core to fit exactly in its guide. It is thus excluded that also the hinge of the bar may slide into the same guide.

To adopt this technique, the metal cores are therefore perfectly rectilinear, with no hinges or other projecting parts. At the end of the molding stage and after introduction of the metal core, the bar will be provided with its hinge in a subsequent working stage. The hinge is usually fixed by riveting or similar techniques.

Though this system has certain advantages compared to that previously described, in that:

in a single working stage one obtains the bar in its final shape and with the metal core inserted therein, and in a single subsequent working stage the hinge is applied; nevertheless, it is not always the preferred system, on account of the fact that:

the technique of applying the hinge by riveting is delicate, the fixing obtained thereby is not so firm and lasting as in the case of hinges welded on the core, the global aesthetical effect is not always acceptable, since a hinge thus mounted is quite massive and bulky.

SUMMARY OF THE INVENTION

All the above drawbacks are now eliminated with the equipment according to the present invention which allows to carry out, in a single working stage in the same machine, both the injection molding of the bar in its final shape, and the introduction of a metal stem or core onto which the hinge has already been previously welded.

This result is obtained—in an injection molding machine of the heretofore described type, having a mold closed at one end by a knife element, beyond which and along the extension of the longitudinal axis of the mold a guide is provided for the metal stem or core—due to the fact that said guide consists of a groove wherein the core is guided with no slack on three of its sides, the fourth side of the core, from which projects the hinge at the end opposite to the knife element, being guided by means apt to be removed as the metal core advances introducing itself in the mold.

BRIEF DESCRIPTION OF THE DRAWINGS

Further characteristics and advantages of the equipment according to the present invention will anyhow result more evident from the following description of some preferred embodiments thereof, illustrated in the accompanying drawings, in which.

DESCRIPTION OF THE PREFERRED EMBODIMENT

Figure 1:
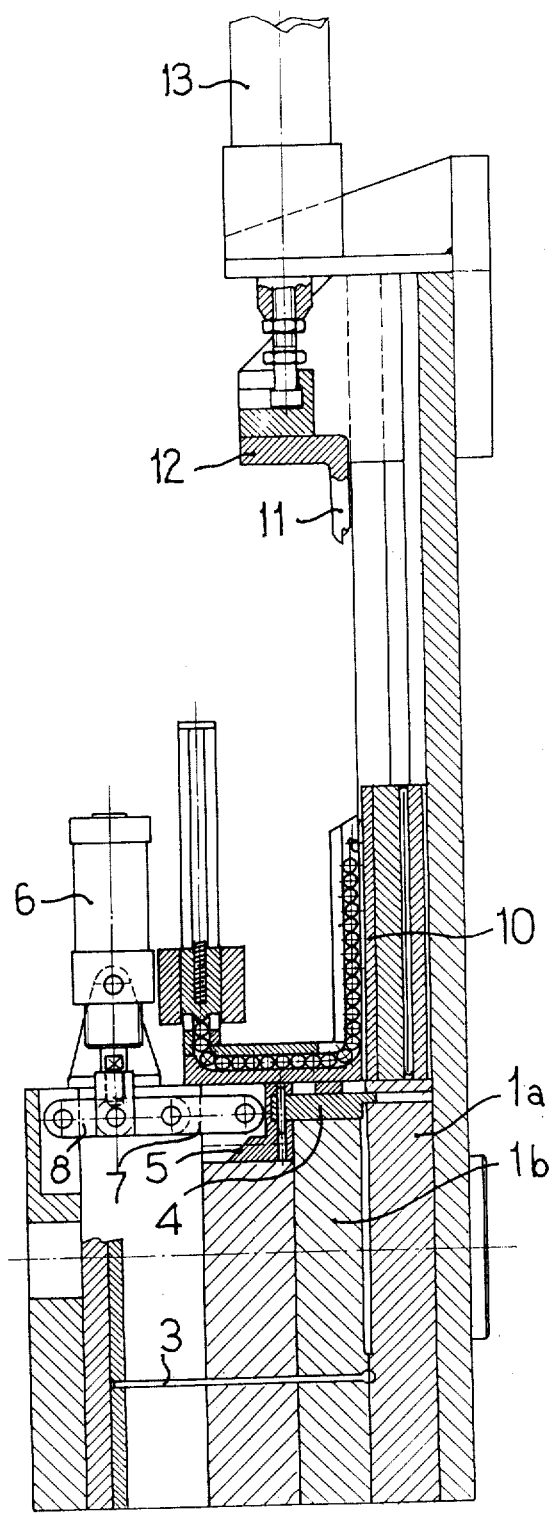
FIG. 1 is a schematic axial section view of the molding equipment according to the invention.
Figure 2:
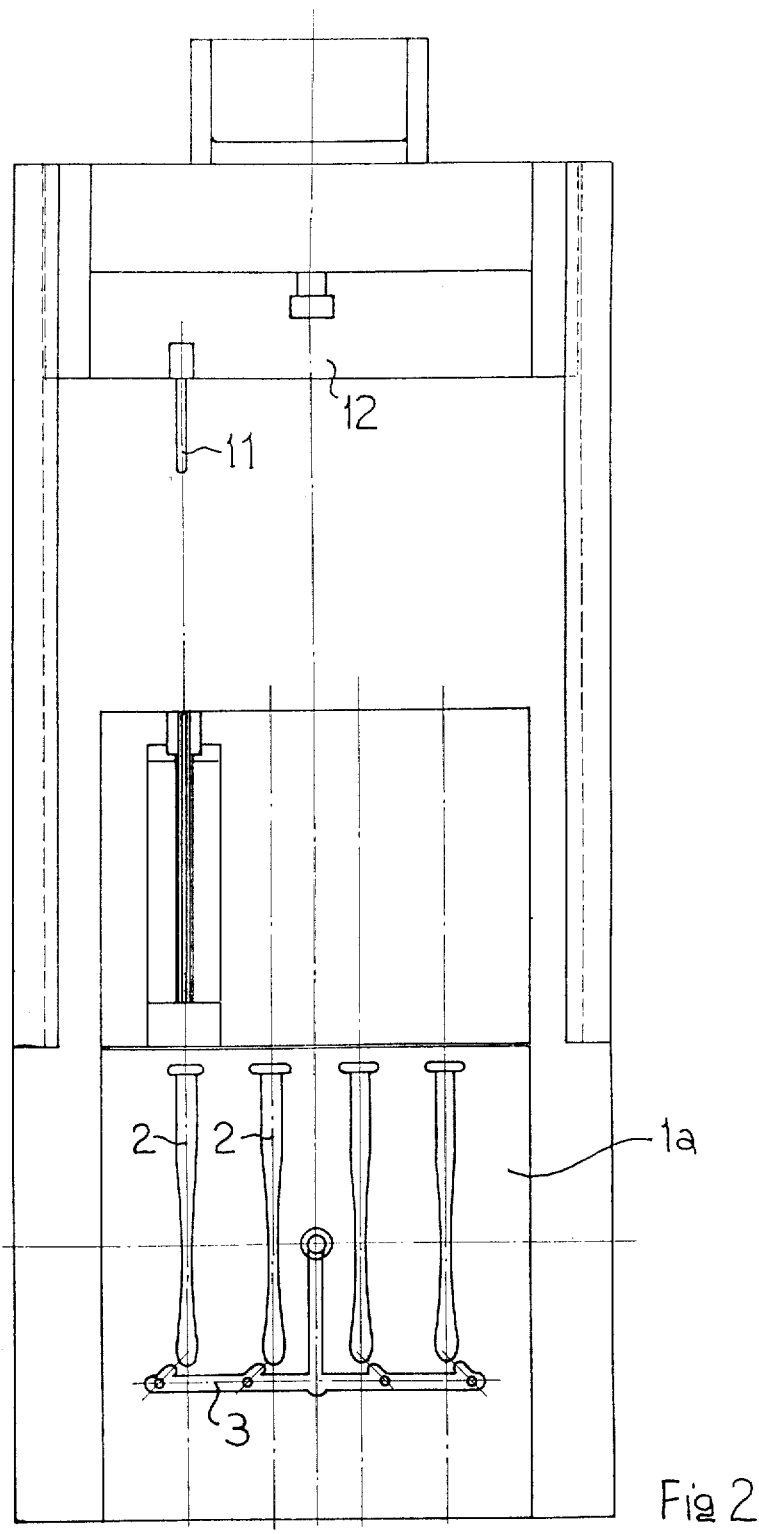
FIG. 2 is a schematic front view of the same equipment.

As shown schematically in FIGS. 1 and 2, the molding equipment comprises a mold in two parts 1a and 1b, which are shown closed one against the other in FIG. 1, while FIG. 2 shows only the mold part 1a, open.

In the mold cavities 2 are molded the bars in their final shape; the plastic material is injected through passages 3. The injection ducts and the other parts of the actual molding machine are not shown in detail, as they are o known type.

According to the present invention, the upper part of the mold cavities 2 is closed by a knife element 4. This upper part of the cavity corresponds to that designed to form the end of the bar provided with the hinge.

The knife 4 is mounted on a slide 5, which can be shifted in a direction transversal to the longitudinal axis of the mold cavities 2. The movement of the slide 5 is controlled by a cylinder 6 by means of two toggle-joint levers 7 and 8.

Figure 3:
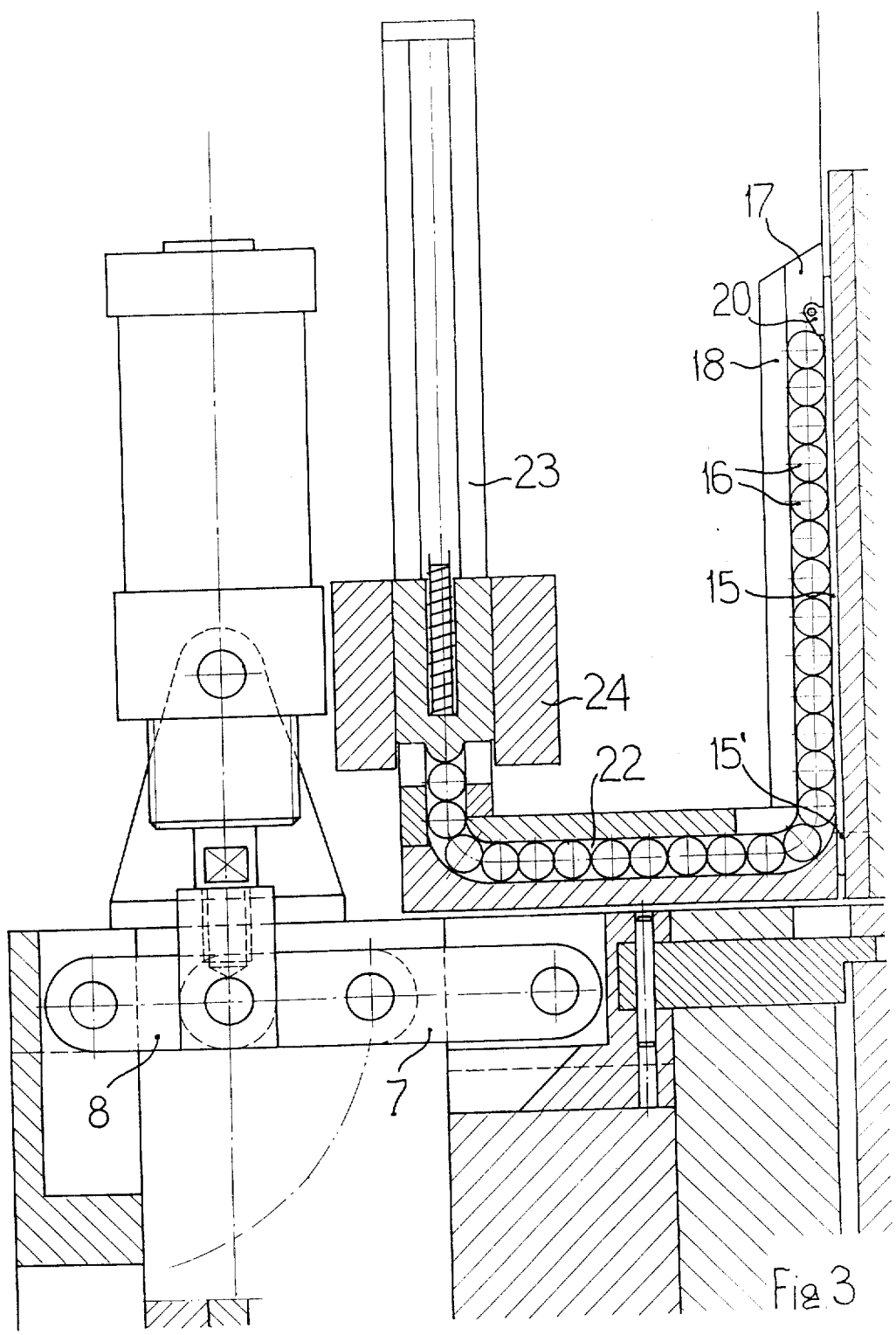
FIG. 3 shows, on an enlarged scale, a detail of the equipment according to FIGS. 1 and 2, concerning the guiding system of the metal stem or core for introduction into the mold.
Figure 4:
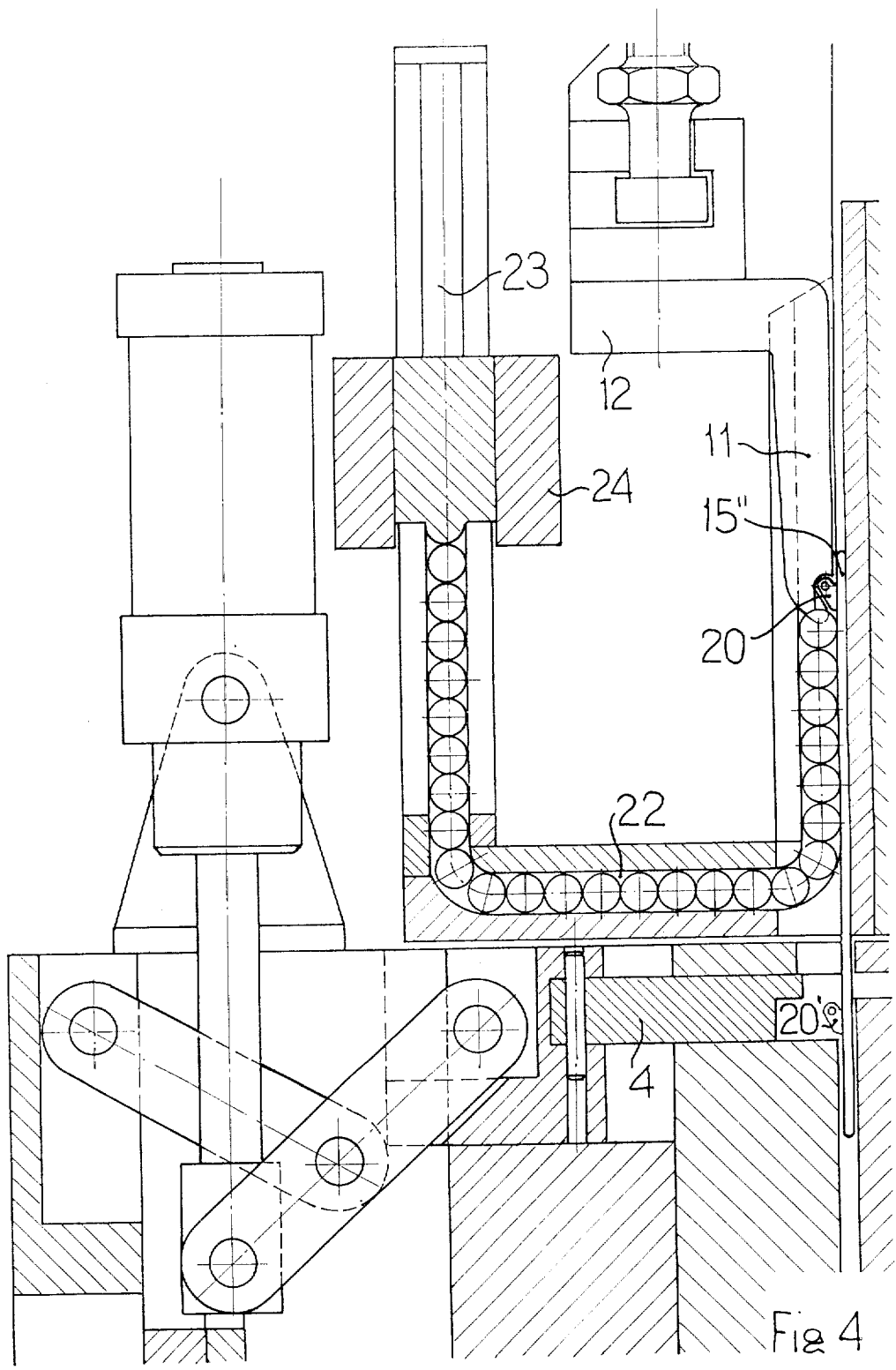
FIG. 4 is a view similar to that of FIG. 3, but showing the stem while it is being introduced.
Figure 5:
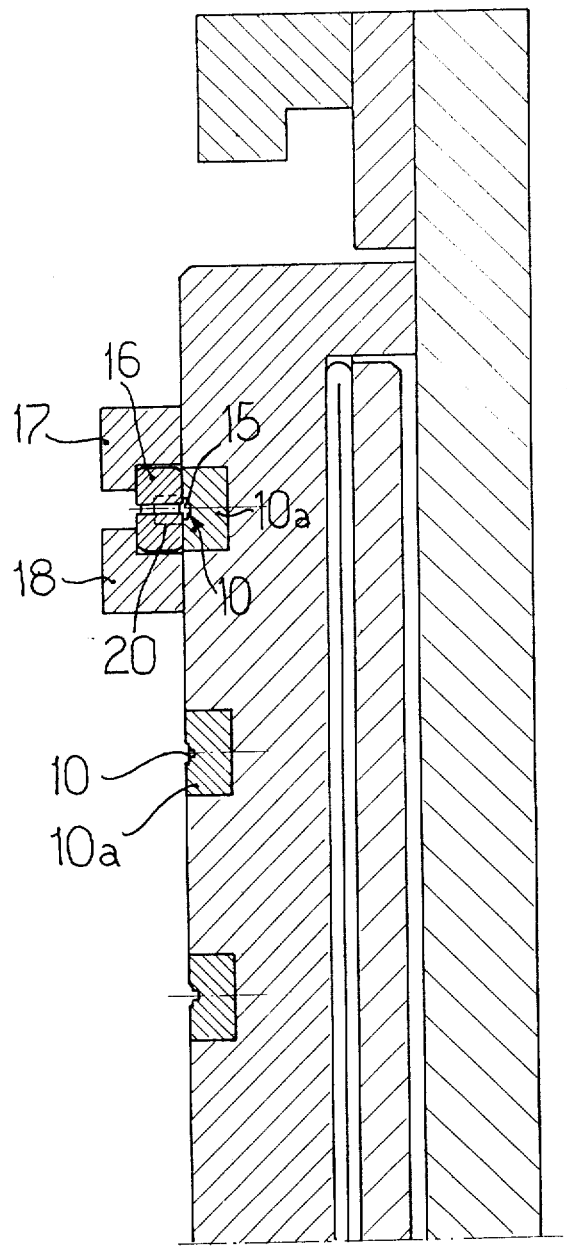
FIG. 5 is a schematic horizontal section view of the equipment shown in the previous figures.

A guide 10, for the metal stem stiffening the bars, is provided on the extension of the longitudinal axis of the cavities 2, as shown in detail in FIGS. 3 to 5. On the extension of the longitudinal axis of the cavities 2 and of the guide 10 is also provided an operating finger 11, mounted on a slide 12 and movable along said longitudinal axis under the control of the cylinder 13.

As shown in FIGS. 3 to 5, the guide 10 practically consists of an axial groove, formed into a rigid piece 10a, fixedly connected to the casing of the machine. The groove 10 is shaped so as to exactly house the stiffening stem 15 or, more precisely, so as to house with no slack all its lateral faces except for one. Since, generally, the stiffening stem 15 has a rectangular or substantially rectangular section, the groove 10 will be shaped so as to provide a proper support for one of the major faces and for the two sides, as for the stem shown in FIG. 5 (which has a rectangular section with two ribs on the major faces).

In this manner, the stem 15 is perfectly guided on three of its faces; the guiding in correspondence of the fourth face is guaranteed—as clearly shown in FIG. 5—by a plurality of rollers 16, with axis perpendicular to that of the groove 10, housed with a minimum slack and slidable into a track 17 formed between a pair of opposed guiding profiles 18.

As results evident from FIG. 5, the profiles 18—through allowing the rollers 16 to slide in a direction parallel to the axis of the guide 10—are apt to keep said rollers tightly adherent to the piece 10a, so that their lateral surface acts as cover for the fourth side of the guide 10. In other words, the stem 15 is firmly held in position—though with possibility to slide in the axial direction—by bearing with three of its faces inside the guide 10 and by resting its fourth face against the lateral surface of the rollers 16.

It should be noted, in particular, that in the case of the stem 15—the fourth face of which is provided, as said, with a rib—each of the rollers 16 is in turn provided with an annular groove, the profile of which mates with said rib. This guarantees a more precise and proper bearing of the fourth face.

Of course, the section of the stem 15 can also be quite different from that shown in the drawings, for instance it can be triangular. In each case it is anyhow indispensable for the groove of the guide 10 to provide a slackless housing for most of the faces of the stem, while at least the face onto which is welded the hinge part should be retained or supported by the rollers 16.

This arrangement is conceived for guiding a stem 15 as that illustrated in FIGS. 3 and 4, namely provided with a hinge 20 which has been previously welded in correspondence of its end 15" opposite to its tip 15'. The hinge part 20, however large it may be—or instance, even as shown with dotted lines in FIG. 5—will be freely housed into the track 17 containing the rollers 16, that is, between the guiding profiles 18.

When the operating finger 11 performs its downstroke, bearing against the end 15" of the stem, namely against the actual hinge 20, in order to push the stem into the mold, it will also push downward the set of rollers 16. These get driven—as clearly shown in FIG. 4, which illustrates an intermediate position of the introduction stroke—and are apt to slide within a channel 22 forming a horizontal extension of the track 17, and then towards a container 23 in the form of a vertical channel. A counterweight 24, guided in turn in the container channel 23 and bearing on the rollers 16, opposes a predetermined force to the sliding of said rollers 16 towards the container 23, so that the rollers are always inclined to keep in mutual contact and in contact with the finger 11, thereby guaranteeing a practically continuous support of the fourth face of the stem 15.

Figure 6:
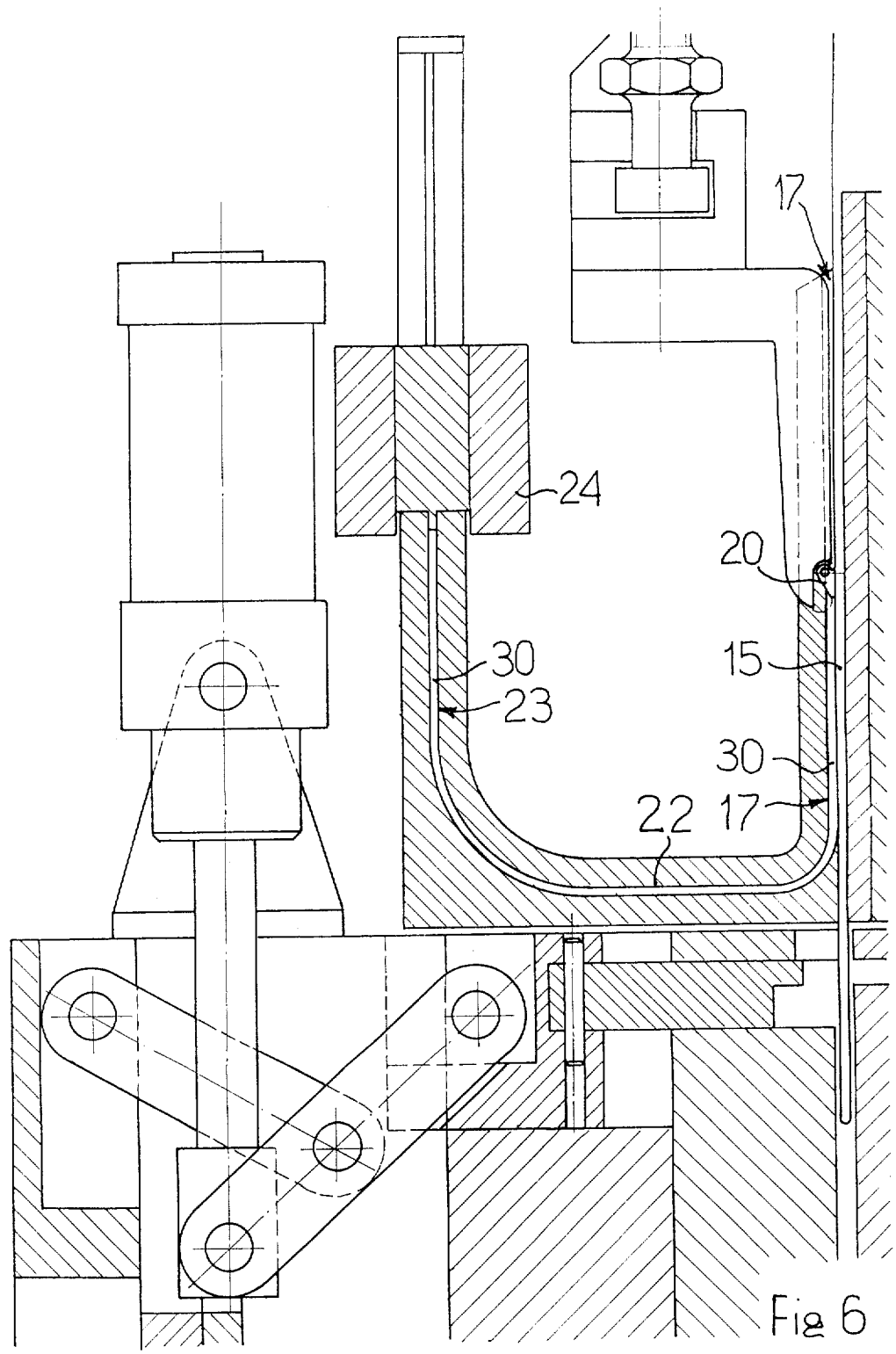
FIGS. 6 and 7 are views similar to those of FIGS. 4 and 5, but showing a modified embodiment.

FIG. 6 shows a different embodiment in which the track 17, between the profiles 18, is far less wide and is used for guiding a flexible metal lamina 30. In this case, the track 17 is connected to the channel 22 and to the container 23 through arched channel sections, as illustrated.

Figure 7:
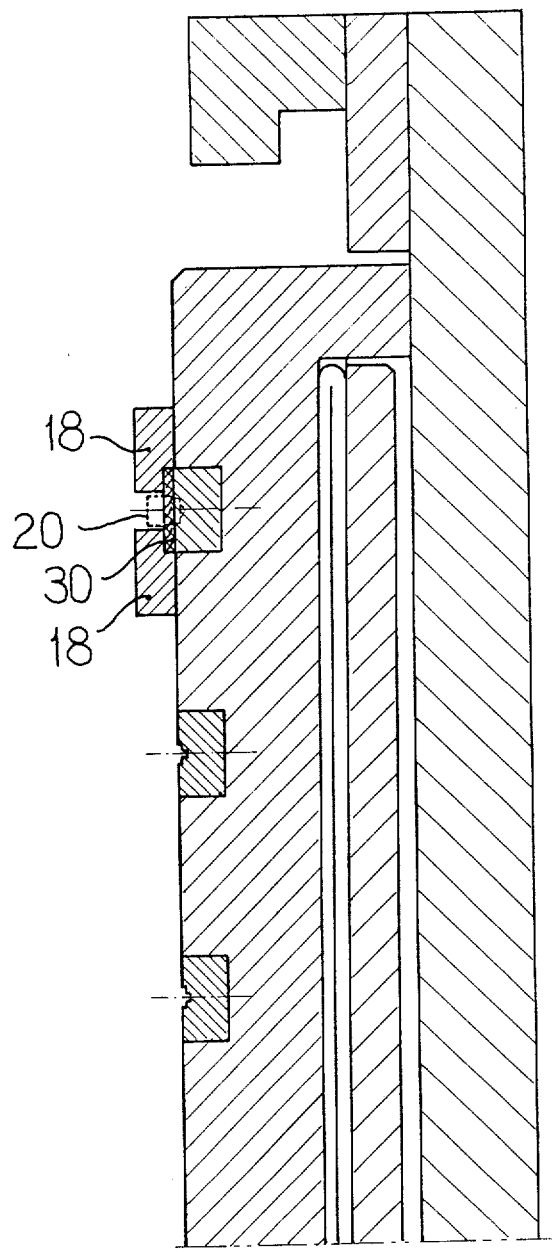

Since in this case the hinge part 20 cannot be housed in the width of the track 17, the opposed profiles 18 will have to be kept sufficiently spaced to allow the hinge part 20 to be housed therebetween, as shown diagrammatically with dotted lines in FIG. 7.

Instead of using a continuous lamina 30, it is obviously possible to use a kind of small rolling shutter, that is a series of parallel lamina strips, mutually hinged or else simply superposed one above the other.

Figure 8:
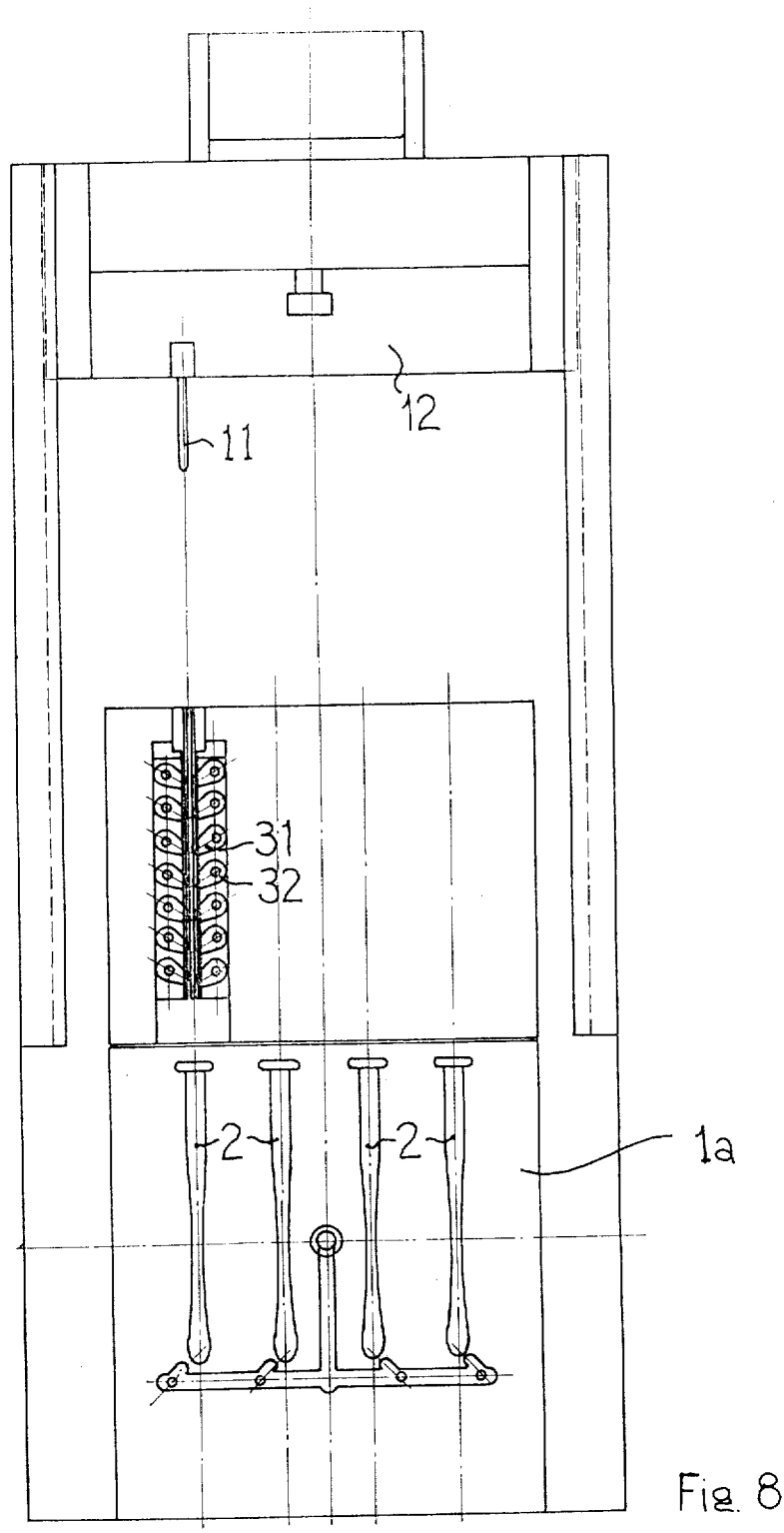
FIG. 8 is a schematic front view similar to that of FIG. 2, but referring to another modified embodiment.

FIG. 8 finally illustrates a still further embodiment in which the fourth face of the stem 15 is retained by a plurality of pawls 31, oscillating about pins 32 perpendicular to the surface of said fourth face. Said pawls are normally held—by spring means not shown—in the position represented in FIG. 8, in which their end is placed astride of the groove forming the guide 10. In this position, as can easily be understood, they form a closing element for the guide 10 and they firmly retain the stem 15.

When the finger 11 starts its downstroke, pushing downward the stem 15, it is the actual hinge part 20 which, projecting out of the groove 10, pushes sideways the pawls 31 against the opposition of the respective springs, so that there is no real obstacle to the descent of the hinge.

In each case, when the finger 11 ends its stroke, the stem 15 is correctly housed and centered within the plastic material previously injected into the cavity 2, while its hinge part 20 projects therefrom, in the position indicated by 20' with dotted lines.

At this stage, the mold can be opened and the bars are withdrawn finished, that is, both in their final shape determined by the mold, and with the stiffening metal stem or core provided with the respective welded hinge part, already perfectly inserted along its longitudinal median axis.

It is anyhow understood that the invention is not limited to the embodiments shown, which have been given by mere way of example, but that it covers all those embodiments, within reach of an expert in the field, in which the stem is guided onto at least one side by means apt to be removed as the stem moves down to penetrate into the mold, while the other three sides thereof are guided along a fixed guide essentially in the form of a groove.

We claim:

1. Equipment for the injection molding of spectacles bars of plastic material incorporating a stiffening metal stem or core, of the type comprising a mold closed at one end by a knife element, beyond which and along the extension of the longitudinal axis of the mold a guide is provided for said metal stem to be inserted into the molded bar, and means for pushing the stem out of the guide and into the mold, characterized in that said guide consists of a groove wherein the stem is guided with no slack on part of its sides, at least another side of the stem—from which projects a hinge previously welded at the end of the stem opposite to that of introduction—being guided by means apt to be removed as the stem advances introducing itself in the mold.

2. Equipment as in claim 1, wherein said removable means consist of a plurality of rollers, guided inside a track juxtaposed to said groove guide, with their axes perpendicular to the longitudinal axis of the grooved guide and with their periphery bearing on the side of the stem carrying the hinge, said rollers being pushed towards a container therefor as the metal stem advances.

3. Equipment as in claim 2, wherein the profile of said rollers, in the position bearing against the metal stem, is apt to mate with the profile of the side of the stem in contact with said rollers.

4. Equipment as in claim 1, wherein said removable means consist of a flexible strap or lamina or rolling shutter, guided inside a track juxtaposed to said grooved guide, one face of which bears onto the stem side carrying the hinge, said strap, lamina or rolling shutter being pushed towards a container as the metal stem moves forward.

5. Equipment as in claim 1, wherein said removable means consist of a plurality of pawls having a face lying substantially on the plane of the stem side carrying the hinge, said pawls being pivoted on axes perpendicular to said plane and oscillating between a working position, in which said face is placed astride of said grooved guide, and a non-working position in which they are placed to the side of said grooved guide.

6. Equipment as in claim 5, wherein said pawls are normally held in said working position by respective spring means, and they are moved to a non-working position as the metal stem advances to penetrate into the mold.

* * * * *